United States Patent [19]

Kelland

[11] 4,209,394
[45] Jun. 24, 1980

[54] MAGNETIC SEPARATOR HAVING A MULTILAYER MATRIX, METHOD AND APPARATUS

[75] Inventor: David R. Kelland, Lexington, Mass.

[73] Assignee: Massachusetts Institute of Technology, Cambridge, Mass.

[21] Appl. No.: 9,705

[22] Filed: Feb. 5, 1979

[51] Int. Cl.² ............................................. B01D 35/06
[52] U.S. Cl. ................................ 210/42 S; 210/222; 210/332; 210/336
[58] Field of Search ............... 210/222, 236, 336, 299, 210/300, 332; 55/307, 308

[56] References Cited

U.S. PATENT DOCUMENTS

| 671,684 | 4/1901 | Xander | 210/336 |
|---|---|---|---|
| 2,329,893 | 2/1922 | Girard | 210/222 |
| 2,792,115 | 5/1957 | Medearis | 210/154 |
| 2,997,131 | 8/1961 | Fisher | 55/308 |
| 3,271,937 | 9/1966 | Stripp | 55/307 |
| 3,610,418 | 10/1971 | Callenwood | 210/336 |
| 3,633,751 | 1/1972 | Stevens | 210/222 |
| 3,887,457 | 6/1975 | Marston et al. | 210/222 |
| 3,912,634 | 10/1975 | Howell | 210/222 |
| 4,033,878 | 7/1977 | Foreman et al. | 210/336 |
| 4,046,681 | 9/1977 | Marston et al. | 210/222 |
| 4,079,002 | 3/1978 | Ianicelli | 210/222 |

FOREIGN PATENT DOCUMENTS

| 904041 | 2/1954 | Fed. Rep. of Germany | 210/222 |
|---|---|---|---|
| 2232434 | 2/1973 | Fed. Rep. of Germany | 210/222 |
| 150101 | 4/1920 | United Kingdom | 210/222 |
| 252684 | 4/1926 | United Kingdom | 55/307 |

Primary Examiner—Theodore A. Granger
Attorney, Agent, or Firm—Arthur A. Smith, Jr.; Robert Shaw

[57] ABSTRACT

A magnetic separator having multiple staggered layers of porous magnetic material positioned to intercept a fluid stream carrying magnetic particles and so placed that a bypass of each layer is effected as the pores of the layer become filled with material extracted from the fluid stream.

18 Claims, 5 Drawing Figures

MAGNETIC SEPARATOR HAVING A MULTILAYER MATRIX, METHOD AND APPARATUS

The Government has rights in this invention pursuant to Contract No. H 0366009/ET-76-6-001-8887 awarded by the Department of Interior, Bureau of Mines (now Department of Energy).

The present invention relates to magnetic separators operable to remove magnetic particles from a fluid stream in which the particles are entrained.

By way of background, attention is called to the following patents: U.S. Pat. Nos. 3,676,337 (Kolm) and 3,902,994 (Maxwell et al). Further background material may be obtained from a report dated October 1977, but not yet published so far as the inventor is aware; the report is entitled "Magnetite Recovery in Coal Washing by High Gradient Magnetic Separation."

A basic teaching in the Kolm patent is the possibility of removing very small particulate magnetic matter from a gaseous or liquid medium. The Kolm separator serves admirably in that task, but clogging problems arise when the particulate matter is taconite, for example, that is to be beneficiated, because as much as fifty percent of the particles that pass through the separator must be removed from the fluid stream in which they are entrained. Further, if the magnetic material is magnetite, a highly magnetic iron oxide, clogging arises from the ease with which the material is magnetically trapped. Various proposals have been made to overcome clogging, e.g., the Maxwell et al patent noted above with a moving matrix. A moving matrix device, such as in the Maxwell et al patent, solves the matrix problem but introduces others, particularly due to the fact that the environment of a taconite plant is inhospitable to equipment with rotating parts. Even in a rotatig matrix device, the matrix is similar to the batch-type Kolm separator, and clogging can still occur in spite of the fact that larger amounts of material can be treated than with the batch device. Accordingly, it is an object of the present invention to provide a magnetic separator which can remove large amounts of highly magnetic material without clogging but is still effective in removing even slightly magnetic colloidal-size particulate matter from a fluid stream, and which is effective, as well, to remove larger magnetic particles.

Another object is to provide such a separator with a geometry which permits bypass of active separating elements thereof by the fluid stream as the active separating elements become loaded with particles separated therefrom.

A further object is to provide a separator which can be easily cleaned after it has become fully loaded with separated magnetic material.

These and still further objects are addressed hereinafter.

The foregoing objects are achieved, generally, in a magnetic separator to receive a fluid (i.e., a gaseous or liquid) stream that contains particles having some magnetic moment (magnetics) and non-magnetics that are entrained in the fluid stream. The separator includes a matrix formed of a number of spaced layers, such layers containing a filamentary ferromagnetic material; means is provided to magnetize the matrix material. The layers are positioned to ensure passage of the fluid therethrough, that is, there is no direct line-of-sight path through the matrix, the layers thereof being separated from one another along the average flow direction of the fluid stream therethrough but being interleaved. Thus, as layers of the matrix at the upstream end become loaded, the loaded layers are bypassed so that the fluid stream follows a serpentine, but unobstructed, path as it moves through the separator.

The invention is hereinafter described with reference to the accompanying drawing in which.

Figure 1:
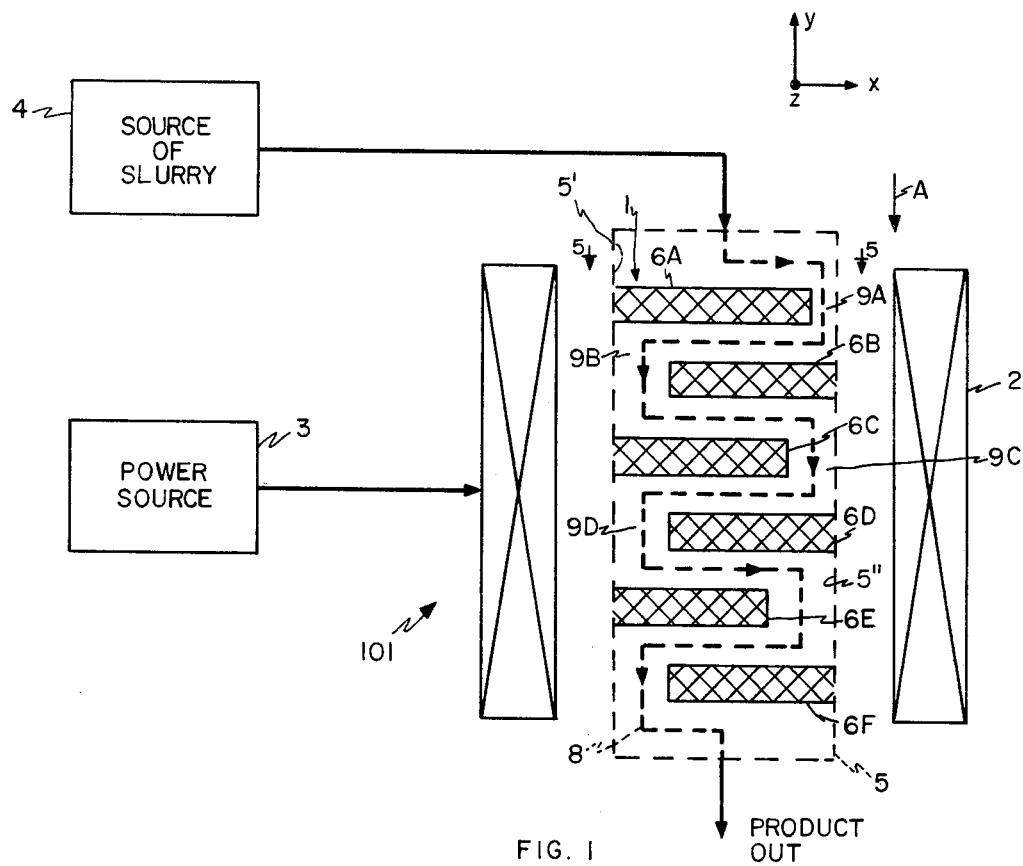
FIG. 1 is a diagrammatic representation of a magnetic separator of the present invention and shows, among other things, a matrix composed of a number of horizontally disposed interleaved layers.
Figure 5:
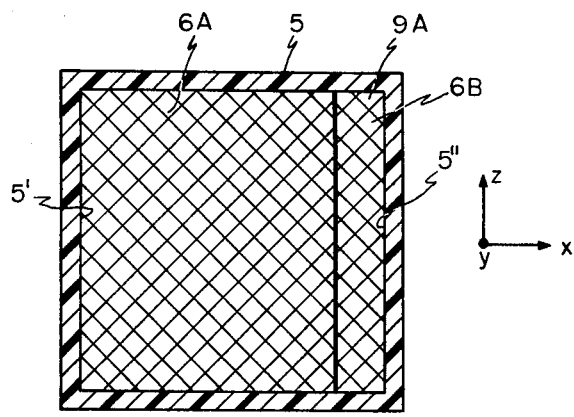
Figure 4:
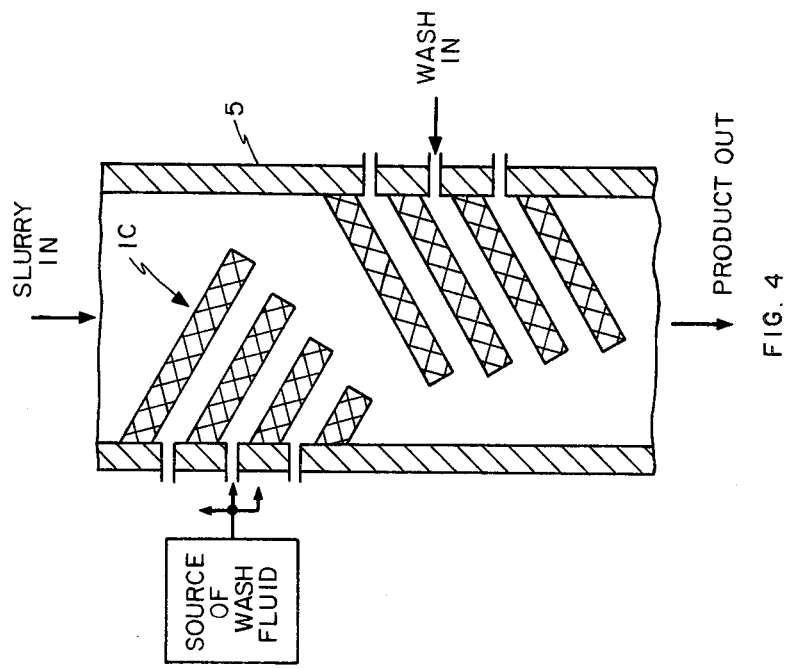

FIG. 4 is a partial side view of the portion of still another modified version of the separator of FIG. 1; and FIG. 5 is a plan view, taken upon the line 5—5 in FIG. 1 and looking in the direction of the arrows, showing first two interleaved layers of the matrix, of FIG. 1, each layer being square in cross dimensions Turning now to FIG. 1, a magnetic separator is shown at 101 consisting of a matrix 1 typically magnetized to saturation by a solenoid 2 that is energized by a power surce 3 to provide a magnetic field in the y-direction in FIG. 1. A slurry containing magnetics and non-magnetics is introduced from a slurry source 4 at the top of a duct or housing 5 whence it flows generally downward in the minus y-direction and successively through a plurality of staggered layers 6A–6F... of a filamentary ferromagnetic magnetic material, such as expanded metal or steel wool, arranged to receive the slurry that passes successively through the layer 6A, then the layer 6B, and so forth. The layers 6A...remove the magnetics entrained in the fluid stream and as the successive layers 6A, 6B... become loaded they are automatically bypassed so that, eventually, after all the layers 6A... are loaded, the serpentine path labeled 8 is followed by the fluid stream. At that juncture, the separator 101 must be stopped and the matrix cleaned.

In the preferred form of the invention, each layer 6A... is composed of one or more sheets of an expanded metal mesh (i.e., a screen-like structure) having openings typically in the range from about four openings per inch to about thirty-two openings per inch, depending, in part, on the size of the particles in the slurry, the density thereof, and so forth. In work done to date, a mesh of eight openings per inch was used in a stainless steel mesh. The layers 6A... are spaced from one another in the average direction of flow of the slurry through a non-magnetic housing 5, i.e., in the minus y-direction in FIG. 1 and are interleaved so that there is no direct line-of-sight path through the matrix 1. With reference to FIGS. 1 and 5, the layers 6A... can be square in cross dimension (but need not be) in the y-z plane and are offset from one another, that is, the layer 6A is secured to the inner side marked 5' of the housing 5 of the layer 6B is secured to the inner side marked 5" and so forth, so that gaps 9A, 9B... are provided at the free ends of the layers 6A, 6B..., respectively, to permit the fluid stream to bypass successive upstream layers as the pores in those layers become filled with magnetics. Adjacent gaps, as best shown in FIG. 1, do not register; alternate gaps register, thereby ensuring flow of the fluid stream through the layers until filled and then automatic bypass thereof. Typically, in work done to date, particle sizes in the slurry have been in the range 1 μm to 1/10 inch, and the slurry had a water carrier. In that work, magnetite and coal particles, mostly, were in the slurry; the magnetite sizes were about 95% less than 44 μm and the coal was up to 1/10 inch.

Figure 2:
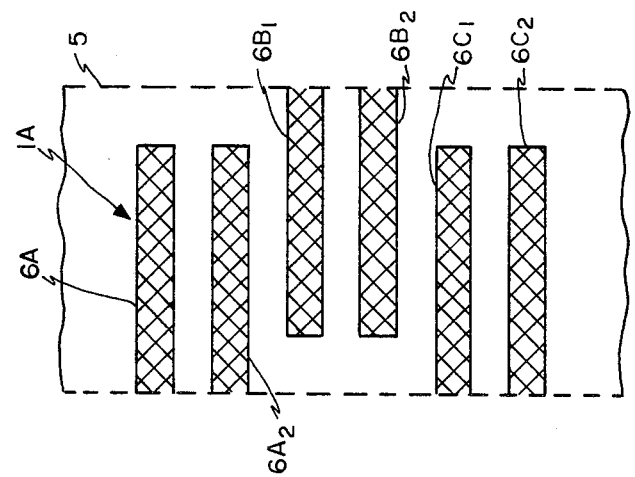
FIG. 2 is a partial side view of a portion of a modified version of the separator of FIG. 1.

In FIG. 2, the magnetic matrix labeled 1A has layers that again are offset from one another but are arranged in two-layer sets $6A_1$–$6A_2$. $6B_1$–$6B_2$..., the layers of each set being registered with one another, as shown, and the sets being offset from one another and interleaved to permit slurry to flow around the free ends of loaded layers of one set and pass through and be filtered by the next successive set until that set is loaded, and so forth, until all the sets are loaded.

Figure 3:
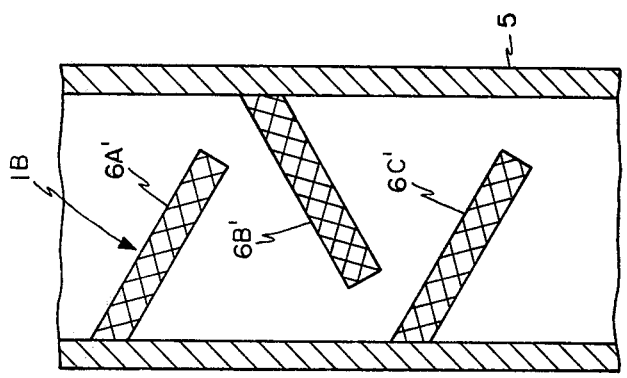
FIG. 3 is a partial side view of a portion of a further modified version of the separator of FIG. 1.

While the planar layers in FIGS. 1 and 2 are oriented horizontally, the layers 6A', 6B'... in the magnetic matrix marked 1B in FIG. 3 are oriented at an angle of about 45° to the horizontal, as are, also, the multiple layers per set in the matrix marked 1C in FIG. 4. The advantage of the layers being angled at about 45° is that either a vertical or horizontal magnetic field may be used to magnetize the layers in the matrix and that flow in the loaded condition is along a shorter path and therefore less likely to clog for mechanical reasons, a problem in any flow device. Also, the flow direction of the fluid slurry stream may be vertical (-y-direction) and a wash fluid stream, if used, may be vertical (+y-direction) or it may be introduced through pipes in the housing 5 in FIG. 4 to flow generally in a horizontal direction. Compressed air may be introduced with the wash water for improved cleaning.

The coil 2 in FIG. 1 is operable to supply a magnetizing field, substantially uniformly distributed in the x-z plane and orthogonal to the plane of the layers 6A... When the layers 6A... are composed of expanded metal mesh, it is best that a substantial component of the magnetic field be orthogonal to the axial dimension of filamentary strands that form the mesh. The matrices 1A... can be made of thin layers of stainless steel wool as in the Kolm patent. A magnetizing field of about 7.5 kilogauss is needed to magnetize the filamentary strands of the matrix, but that field may be higher to magnetize magnetics in the slurry. A 1–20 kilogauss magnetizing field may be used, depending on requirements, and the coils 2 may be superconducting. The fluid stream through the matrix need not be vertical.

Some general comments are contained in this paragraph. The separator herein disclosed has a matrix formed of a plurality of layers of a filamentary material. The preferred form in work done to date is an expanded metal mesh which is a screen-like material, each layer of the matrix being composed of one layer of the mesh. In the embodiment of FIG. 1, adjacent layers of mesh are attached to opposite inside surfaces of the housing 5 and the side walls adjacent thereto but a space or gap is left at the unattached end of each layer. It will be appreciated on the basis of the explanation herein, that other geometries tha disclosed herein may be employed. The important matter to be considered is that short circuits, whereby the slurry stream avoids all layers, must be avoided; but, on the other hand, the bypass gaps must be adequate to permit bypass of successive upstream layers as they become loaded. Although the filamentary magnetic material forming the matrix is usually ferromagnetic, a paramagnetic material (e.g., aluminum) may be used; see "The Use of Paramagnetic Matrices for Magnetic Separations," Riley et al, *Filtration and Separation*, July/August, 1977. The housing 5, which is shown merely in broken line form in FIGS. 1 and 2, may be made of aluminum (which was used by the inventor in a test system), as is indicated by the cross-hatching in FIGS. 3 and 4, or some electrically insulating material as is indicated by the cross-hatching in FIG. 5; also the housing 5 can have cross-dimensions that are round or some other shape.

Further modifications of the invention herein disclosed will occur to persons skilled in the art and all such modifications are deemed to be within the spirit and scope of the invention as defined by the appended claims.

What is claimed is:

1. A magnetic separator comprising a duct having an inlet and an outlet and having walls defining a fluid flow path in a flow direction from the inlet to the outlet, a porous matrix means in the duct comprising a plurality of spaced apart porous layers of filamentary material arranged along said flow direction and extending transversely to the flow direction, each of said spaced apart layers having an associated gap for the bypassing of fluid when the layer becomes clogged, the layers being positioned in the duct so that fluid flowing along said flow path in said flow direction from the inlet to the outlet is constrained to pass through said layers, means for supplying a stream of fluid containing magnetic particles to said inlet, means for magnetizing the filamentary material to cause the magnetized material to remove magnetic particles from the stream as the stream passes through the porous layers so that magnetic particles are retained on the layers, the porosity of the porous layers and the size of the gaps being such that the stream flows along said flow path in said flow direction from the inlet to the outlet and passes through said spaced apart layers without substantial bypassing of said layers until a layer becomes clogged with magnetic particles and then the stream flows around the clogged layer through the associated gap to bypass the clogged layer automatically and to reach and pass through the next layer that is not clogged, whereby substantially the full volume of the matrix means is utilized effectively to remove magnetic particles initially and the effective volume of the matrix means utilized is reduced through bypassing as layers of said matrix means become clogged.

2. A magnetic separator in accordance with claim 1, wherein the gaps associated with the layers of each pair of successive layers are located at opposite end portions of the layers of the pair.

3. A magnetic separator in accordance with claim 1, wherein the layers are arranged in successive sets and the gaps of the layers of each pair of successive sets are located at opposite end portions of the sets of the pair.

4. A magnetic separator in accordance with claim 1, wherein the layers extend along planes orthogonal to said flow direction.

5. A magnetic separator in accordance with claim 1, wherein the layers extend along planes that are inclined relative to said flow direction at angles other than 90°.

6. A magnetic separator in accordance with claim 5, wherein said angles are about 45°.

7. A magnetic separator in accordance with claim 1, wherein the layers comprise expanded metal mesh sheets.

8. A magnetic separator in accordance with claim 7, wherein the sheets comprise stainless steel.

9. A magnetic separator in accordance with claim 8, wherein the mesh sheets have openings in the range of from about 4 openings per inch to about 32 openings per inch.

10. A magnetic separator in accordance with claim 1, wherein the layers comprise at least about 8 screens.

11. A magnetic separator in accordance with claim 1, wherein the layers comprise stainless steel wool.

12. A magnetic separator in accordance with claim 1, wherein the layers comprise ferromagnetic material.

13. A magnetic separator in accordance with claim 1, wherein said means for supplying a stream of fluid comprises means for supplying a stream of fluid containing highly magnetic particles.

14. A magnetic separator in accordance with claim 1, wherein said means for magnetizing the filamentary material comprises means for producing a magnetic field along said flow direction.

15. A magnetic separator in accordance with claim 1, wherein said means for magnetizing the filamentary material comprises means for reducing the magnetic field in the region of said filamentary material to about zero and wherein said magnetic separator further comprises means for introducing a high-velocity fluid washing stream into the matrix means.

16. A magnetic separator in accordance with claim 15, wherein said means for introducing said washing stream into the matrix means comprises means for causing the washing stream to flow in the duct in a direction other than the first-mentioned flow direction.

17. A magnetic separator in accordance with claim 1, wherein said filamentary material is paramagnetic.

18. A method of separating magnetic material from a fluid stream, that comprises providing a duct having an inlet and an outlet and having walls defining a fluid flow path in a flow direction from the inlet to the outlet, providing a porous matrix means in the duct comprising a plurality of spaced apart porous layers arranged along said flow direction and extending transversely to the flow direction, each of said spaced apart layers having an associated gap for the bypassing of fluid when the layer becomes clogged, the layers being positioned in the duct so that fluid flowing along said flow path in said flow direction from the inlet to the outlet is constrained to pass through said layers, supplying a stream of fluid containing magnetic particles to said inlet, magnetizing the magnetic material of said porous layers so that magnetic particles will be removed from the stream and retained on the porous layers when the stream passes through the porous layers, passing said stream along said flow path in said flow direction from the inlet to the outlet and through said spaced apart layers without substantial bypassing of said layers until a layer becomes clogged with magnetic particles and then passing the stream around the clogged layer through the associated gap to bypass the clogged layer automatically and to reach and pass through the next layer that is not clogged, whereby substantially the full volume of the matrix means is utilized effectively to remove magnetic particles initially and the effective volume of the matrix means utilized is reduced through bypassing as layers of said matrix means become clogged.

* * * * *